United States Patent

Marrs et al.

[11] Patent Number: 5,590,567
[45] Date of Patent: Jan. 7, 1997

[54] SNAP RETAINER AND RETAINER SYSTEM

[75] Inventors: Robert A. Marrs, Amboy; Kurt J. Hudoba; John W. Willis, both of Kokomo, all of Ind.

[73] Assignee: Delco Electronics Corporation, Kokomo, Ind.

[21] Appl. No.: 403,611

[22] Filed: Mar. 14, 1995

[51] Int. Cl.$^6$ .................... F16C 1/14; F16L 3/13
[52] U.S. Cl. ............... 74/502.4; 74/502.6; 248/67.7; 248/74.2
[58] Field of Search ............... 74/502.4, 502.6; 248/67.7, 74.2, 222.12

[56] References Cited

U.S. PATENT DOCUMENTS

| | | | |
|---|---|---|---|
| 2,166,916 | 7/1939 | Lombard | 248/74.2 X |
| 3,289,491 | 12/1966 | Conrad | 74/502.4 |
| 3,513,718 | 5/1970 | Tomecek | 74/502.4 |
| 4,470,179 | 9/1984 | Gollin et al. | 248/74.2 X |
| 4,762,296 | 8/1988 | Kraus et al. | 248/74.2 |
| 4,917,340 | 4/1990 | Juemann et al. | 74/502.6 X |

*Primary Examiner*—Vinh T. Luong
*Assistant Examiner*—Mary Ann Battista
*Attorney, Agent, or Firm*—Jimmy L. Funke

[57] ABSTRACT

The end of a cable or other elongated object is held in a plastic retainer molded of one piece. The retainer has a base with a pocket for holding the object, upstanding supports alongside the pocket and a retaining element mounted between adjacent supports at each side of the pocket. The retaining element defines a snap element and resilient hinges, either flexible webs or torsion arms, which couple each end of the snap element to a support for rotation of the snap element about an axis. The axes are above the pocket and the snap element extends down to hold the object in the pocket. Optional over-center action provides a locking function. Release tabs on the retaining element extending above the axis permits release of the cable by pinching the tabs together. Grooves or ridges on the cable end engage the retainer for axial retention and permit axial adjustment as well. A receiving opening in the retainer is shaped to guide cable end insertion.

1 Claim, 3 Drawing Sheets

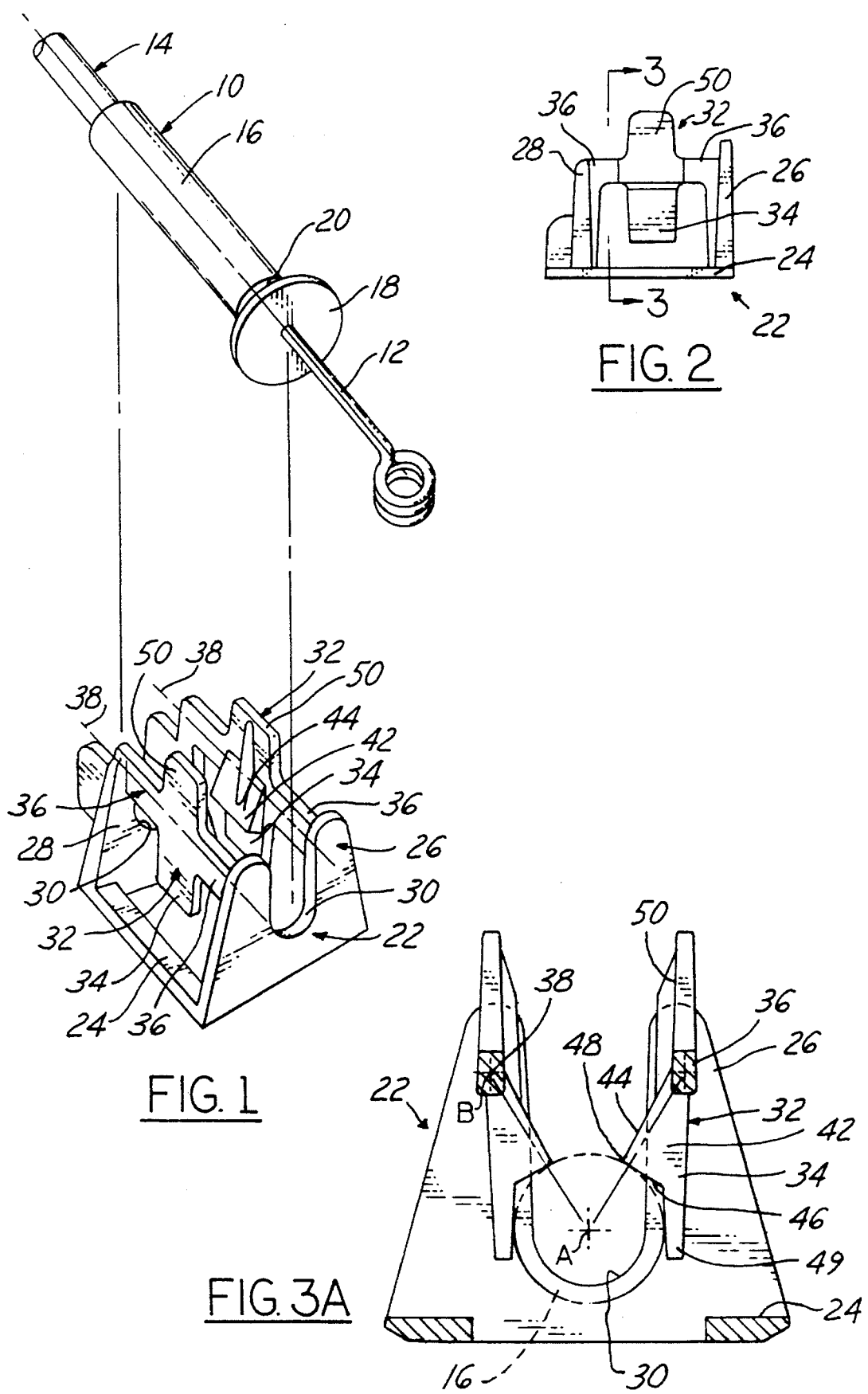

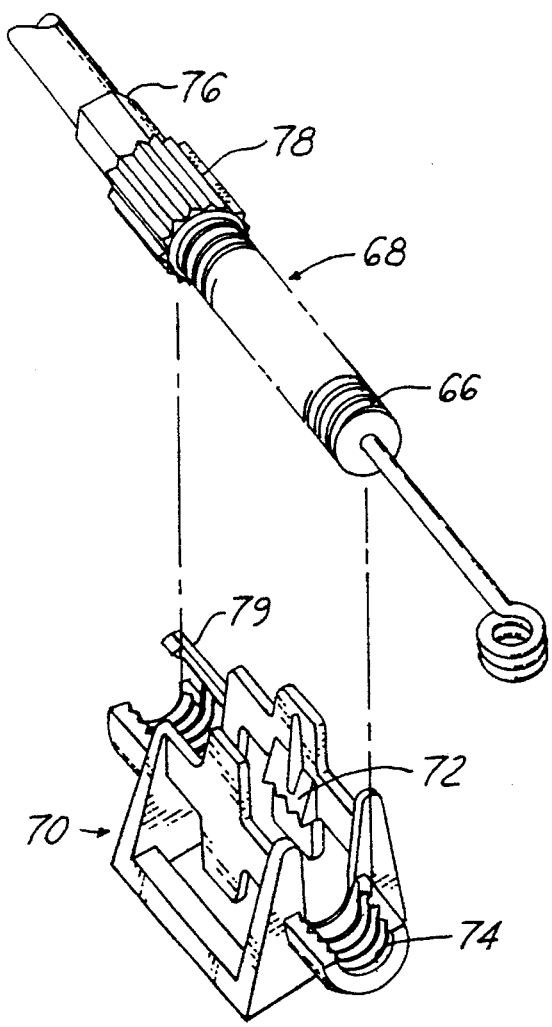
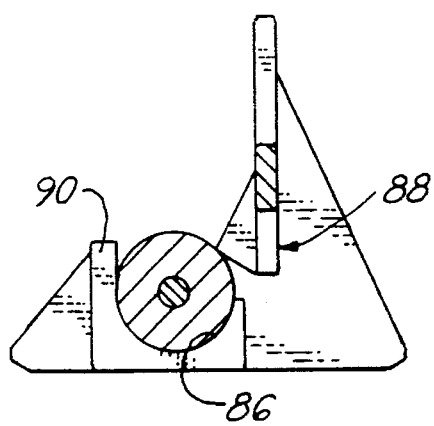
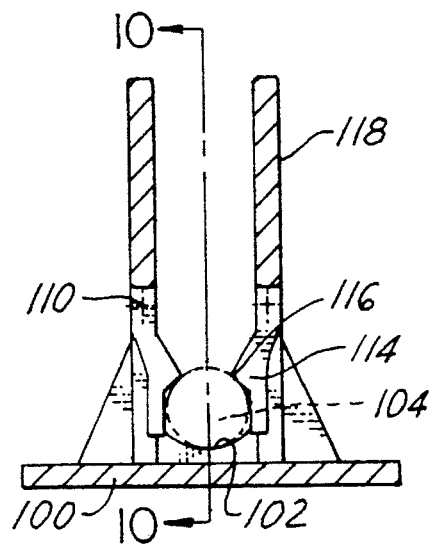
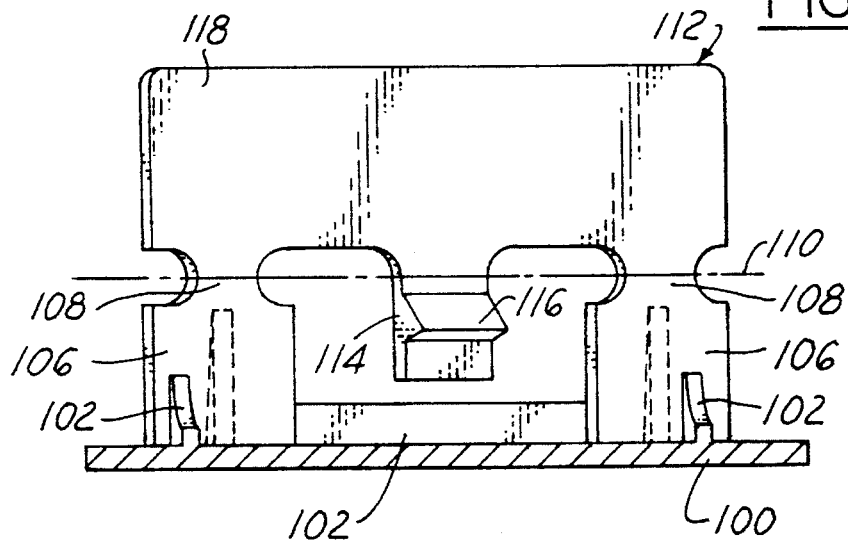

SNAP RETAINER AND RETAINER SYSTEM

FIELD OF THE INVENTION

This invention relates to a system including an elongated object and a retainer for securing the object, and particularly to a torsional snap retainer.

BACKGROUND OF THE INVENTION

It is often desired to secure an elongated object to some other object. For example, in automotive controls flexible cables are used to remotely operate a device. Each end of the cable sheath must be fastened to a stationary surface. It is desirable that the cable be easily installed and locked into place as well as easily removed, and that the fastener or retainer be strong axially and strong to resist unwanted disassembly.

Usually snap-in cable retainers have utilized a cantilever snap beam of some sort to allow movement of a retaining tab about an axis. These have relied on a strong retention spring force to secure the cable. Such spring force must also be overcome to assemble the cable to the retainer, so that assembly is not easy. Intentional release is also difficult; even if release tabs are provided to pull apart retaining elements, the pulling maneuver is generally awkward to execute.

SUMMARY OF THE INVENTION

It is therefore an object of the invention to secure an elongated object in place by a retainer having low insertion force and strong resistance to unwanted removal, and is ergonomically easy to install. An additional object in such a retainer is easy release of the object from the retainer. Another object is to employ over-center action in such a retainer to lock the object in place. A further object is a retainer system allowing axial adjustment of the object relative to the retainer. Still another object is a retainer system that restrains an elongated object in most or all degrees of freedom and particularly is strong in the axial direction.

A unique retainer as well as a retainer system comprising the retainer and an especially adapted elongated object are proposed to fulfill the objects. The retainer is a molded plastic device which may be attached to an anchor surface at the desired place of fastening the object, or if the anchor surface is a molded part, the retainer is preferably integrally molded in the part. In either case a base, which may be the molded part, carries a set of spaced supports, and a pair of retaining elements extend between the supports. One or both of the supports has a pocket into which the object may be seated. The retaining elements are arranged on either side of the object and contact the object to hold it in the pocket. To insert or remove the object the retaining elements are easily swung to either side to clear a passage for the object. Each of the retaining elements has hinges on a hinge axis and supported on the supports, and a center snap element which is movable about the axis into a retaining or lock position under a bias force supplied by the hinges. The hinges axis is above and to either side of the object, and the snap element is positioned between the axis and the object. An object is inserted into the pocket by simply pressing it against the snap elements which easily swing aside during insertion and then snap into a lock position where it securely grips the object. The hinges comprise torsion bars extending from either side of the snap elements on the hinge axes. Alternatively, the hinges are flexible webs mounted atop the supports and engage an underside of the snap elements.

Preferably an over-center action is incorporated by shaping the retaining element and the snap element such that when the object is seated in the pocket each snap element contacts the object at an over-center point. That is, the contact point is so positioned relative to its axis and the object that any removal force exerted by the object on the snap element urges the snap element away from its release position and so tightens the locking grip.

It is sometimes necessary to remove the object from the retainer. Means for intentional release comprises a release tab extending from the retaining element on the opposite side of the axis from each snap element. By manually pinching together the two release tabs the snap elements are rotated about the axes to a release position, clearing the way for object removal. An alternative design lacks the over-center action and thus allows removal of the object by forcefully pulling it from the retainer so that the snap elements are pushed aside by the object force.

To prevent the object from sliding axially in the retainer, one or more features on the object cooperate with mating features on the retainer for axial locking. A single circumferential groove around the object which fits over a support on the retainer is one embodiment of axial locking provision. It is suitable where no choice of axial positioning is desired. On the other hand, a plurality of such features axially distributed on the object affords a choice of axial position in the retainer. For example, a series of axially spaced annular ridges on the object and cooperating ridge-engaging teeth on some part of the retainer permits axial locking in a choice of many axial positions. Instead of annular ridges, a thread formation on the object can be used. Then the object can be adjusted axially after installation in the retainer. This assumes that the object has a circular cross section. In cases where the object is hexagonal or square, for example, the threaded embodiment would not apply. Grooves or ridges conforming to the object shape would still be useful, however, for selective positioning of the object in the retainer.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an exploded view of a cable end and retainer system, according to the invention;

FIG. 2 is a side view of the retainer of FIG. 1;

FIGS. 3A and 3B are cross-sectional views of the retainer of FIG. 2 taken along line 3—3 for locked position and release position, respectively;

FIG. 6 is an exploded view of a cable end and retainer system, according to a fourth embodiment of the invention;

FIG. 8 is a cross-sectional view of a retainer and cable system according to a sixth embodiment of the invention; and FIG. 9 is a cross section of a retainer according to a seventh embodiment of the invention; and FIG. 10 is a cross section of the retainer of FIG. 9 taken along line 10—10.

DESCRIPTION OF THE INVENTION

Figure 3B:
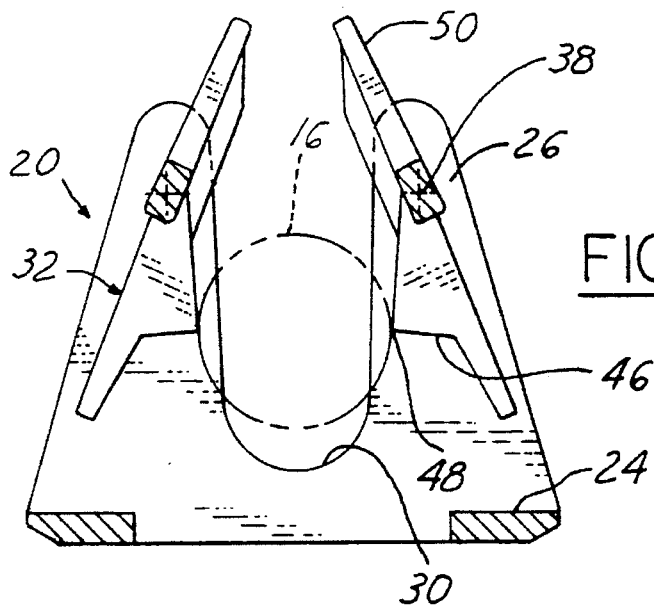

While the ensuing description is directed to a retainer system and a retainer, per se, for securing an end of a flexible cable for automotive controls, it will be recognized that the principles of the invention apply as well to the fastening of other elongated objects to an anchor site. In vehicles such an object be a wiring harness, for example. In other applications, the application may be a fastener for a conduit in a building, for example. It will be noted that since the retainer is a plastic molded part which undergoes torsion, there will be some restriction in which commonly used molding polymers might be useful. In fact the restriction is not great since most such plastics have properties consistent with this application; ABS, acetal and polycarbonate are only some of the well known materials which are successfully applied to the proposed molded retainer.

Referring to FIGS. 1–3, a cable 10 comprises a slidable wire 12 centrally positioned in a flexible sheath 14 which terminates in a cylindrical barrel 16. The barrel 16 has a large diameter button 18 at its end and an annular groove 20 adjacent the button 18. A one-piece molded retainer 22, which may be a separate fastener or an integral molding on a larger part, has base 24 (which might be defined by the larger part), spaced front and rear supports 26 and 28, respectively, each having a U-shaped pocket or seat 30 for receiving the barrel 16 of the sheath, and two retainer elements 32, one on either side of the pockets 30 or on either side of the barrel when installed in the retainer 22.

Each retainer element 32 has a central snap element 34 supported by a hinge in the form of torsion arms 36 extending from both sides along a hinge axis 38 to one of the supports 26 or 28. The snap element 34 is a rectangular tab extending from the axis 38 toward the base 24 and has on its inner side a locking feature 42 having a ramp 44 on its upper portion and a grip surface 46 on its lower portion joining at a line 48. Each torsion arm 36 is a beam subject to twisting when the snap element is deflected or moved from its rest position. The rest or relaxed position as shown in the drawing is the position which locks the barrel 16 in the pocket 30 of the supports. Each retainer element 32 also has a release tab 50 protruding from the opposite side of the axis as the snap element 34. Manipulation of a release tab 50 can then swing the snap element about the hinge axis 38 as shown in FIG. 3B for removal of the barrel from the retainer. The two retainer elements are mounted on opposite side of the pockets 30 so that the lock features 42 face inward toward one another. Removal of the cable end from the retainer is thus accomplished by pinching the two release tabs 50 to spread the snap elements to release the barrel. The retainer element is cruciform, comprising the two outstretched torsion arms, the depending snap element and the upstanding release tab.

In operation, when the barrel 16 of the cable end is inserted into the retainer 22, the groove 20 is aligned with the support 26 to receive the edges of the U-shaped pocket 30, the large button 18 assisting in the alignment, thus assuring the axial position of the cable end relative to the retainer 22. During the insertion, the barrel 16 presses outwardly on the ramps 44 against the torsional force of the torsion arms 36 to swing the snap elements out of the way. When the barrel becomes seated in the pocket 30, the snap elements snap back to rest position with the line 48 on the locking feature engaging the barrel to hold the cable end in secure position. An over-center locking action is incorporated into the design by forming the locking feature such that a removal force on the barrel pushes the snap elements in the locking direction. A lower stop portion 49 of the snap element 34 bears against the side of the barrel to prevent movement of the snap element beyond the rest position when a removal force is exerted. To achieve the over-center action, as shown in FIG. 3A, the line 48 on the locking feature contacts the barrel 16 inside the line A-B, where B is on the torsion axis 38 and the line A-B is normal to the barrel surface. Thus torsion force is not relied upon to secure the barrel and thus may be small enough for easy installation and removal of the cable end.

Figure 4:
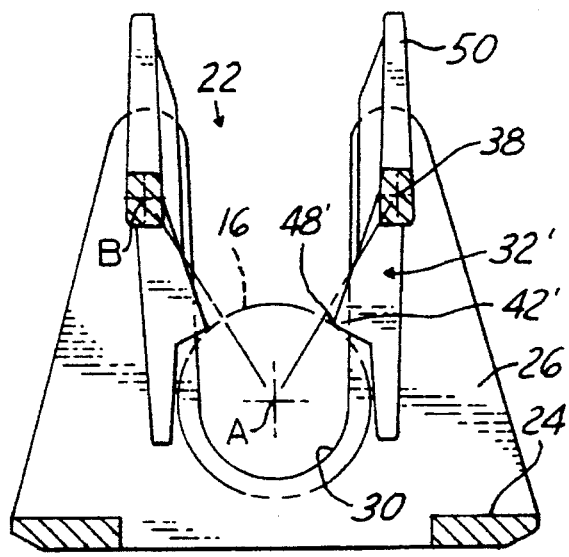
FIG. 4 is a cross-sectional view of a second embodiment of the retainer.

In an alternative embodiment, shown in FIG. 4, the locking feature 42' on the retainer element 32' is configured such that the line 48' contacts the barrel 16 outside the line A-B. In that case there is no over-center action and a sufficient removal force on the cable end will swing the snap element out of the way. The amount of removal force required for such removal is determined by the spring constant of the torsion arms and the position of the contact line 48' relative to the line A-B.

Figure 5:
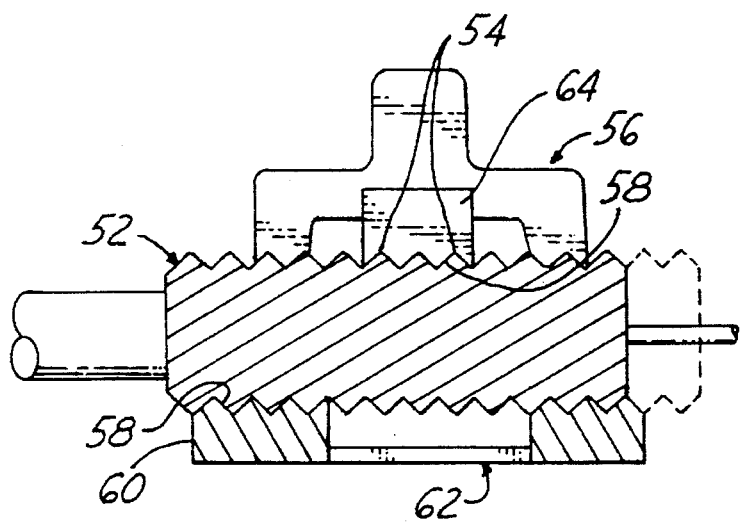
FIG. 5 is a longitudinal cross section of a cable end and retainer system according to a third embodiment of the invention.

In the FIG. 1 embodiment, the groove 20 in the barrel 16 mated with the support 26 wall to fix the axial position. Another retainer system embodiment, shown in FIG. 5 is similar to the FIG. 1 embodiment but has provision for many axial positions of the cable end in the retainer. The barrel 52 has a series of axially spaced annular ridges 54. The retainer 56 has one or more portions defining notches or teeth 58 for mating with the ridges 54 upon assembly so that the desired axial position of the barrel 52 is determined upon assembly, the barrel being shiftable several ridges one way or the other prior to being seated in the retainer 56. The retainer has the seating pocket 60 of the base 62 and/or the locking tab 64 molded with gripping teeth 58.

As shown in FIG. 6, still another variant of the retainer system uses a spiral ridge or a thread 66 on the barrel 68 of the cable end instead of annular ridges. The retainer 70 is much the same as that of FIG. 5, the toothed locking tab 72 or the pocket 74 cooperating with the thread 66. With this threaded barrel the axial position of the cable end is adjustable after assembly to the retainer by rotating the barrel. A hex form 76 is included on the end of the barrel 68 to facilitate the barrel rotation for axial adjustment. A gear-like ratchet member 78 adjacent the hex form cooperating with a resilient detent finger 79 on the retainer provides resistance against rotation to prevent inadvertent adjustment of the barrel position. The ratchet member 78 is sufficiently long to allow axial travel of the barrel over a useful range.

Figure 7:
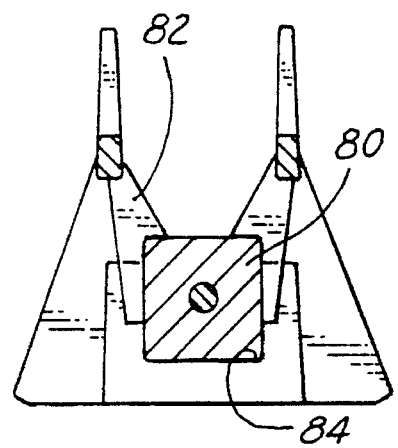
FIG. 7 is a cross-sectional view of a retainer and cable system according to a fifth embodiment of the invention.

A form of the retainer and the object it holds is shown in FIG. 7. There the cable end 80 or other object is square in cross section and the snap elements 82 and the seating pocket 84 are designed to conform to the square shape.

FIG. 8 illustrates another version of the snap retainer. Instead of being bilateral with a retainer element on each side of the seating pocket 86, only one retainer element 88 is used. The side of the support 90 opposite the one retainer element 88 is relatively short since the tall support structure for a second retaining element is not needed, but the support is sufficient to define the pocket 86. The principles of operation are the same as for the previously described embodiments, but the pinching together of two release tabs does not pertain.

Another embodiment of the invention is shown in FIGS. 9 and 10. Instead of a torsional hinge arrangement, the hinge action is provided by bending webs or beams. A base 100 defines a seating pocket 102 for the barrel 104 of a cable end or other object, and carries vertical supports 106 (if the base is considered to be horizontal) which extend above the position of the barrel. A retaining element 112 has flexible webs 108 coupled to the tops of the supports 106 to define a hinge axis 110 for the retaining element. The retaining element 112 extends between a pair of the supports 106 and has a depending snap element 114 extending below the axis 110, with a locking feature 116 for engaging the top of the barrel 104 in the same manner as the feature 42 in the FIG. 1 embodiment. Release tab 118 extends upwardly from the axis 110 to define the top of the retaining element. The geometry of this embodiment is the same as for FIG. 3; i.e., each hinge axis is above and outside the seating pocket and the object contained within the pocket. According to the design of the locking tab and its position of engagement of the object, over-center locking action can be obtained. Pinching together the release tabs 118 causes the snap element 114 to swing out to release the object 104 from the pocket 102.

The embodiments of the invention in which an exclusive property or privilege is claimed are defined as follows:

1. A snap retainer system comprising:

an elongated object to be held, the object defining an axis and an external thread including a gear-like ratchet member;

an integral molded retainer having a base, axially spaced support members on the base and a pair of retaining elements carried between the support members;

the base having means for seating the object in a secure position;

each of the pair of retaining elements having snap means for rotation about a hinge axis spaced from the object and for engaging the object between the axis and the base, and resilient hinge means anchored to the support members for defining the hinge axis and for biasing the snap means to a closed position for holding the object in a secure position and for allowing movement to an open position;

the retainer includes a toothed gripping means for cooperatively engaging the external thread, whereby the axial position of the object in the retainer is adjustable by rotating the object about said axis in the retainer;

and a detent finger on the retainer for engaging the ratchet member, thereby resisting rotation of the object to hold the object in an adjusted position.

* * * * *